March 30, 1937. J. H. VAN ZANDT 2,075,487
EFFECTIVE TEMPERATURE THERMOSTAT
Filed March 9, 1935   3 Sheets-Sheet 3
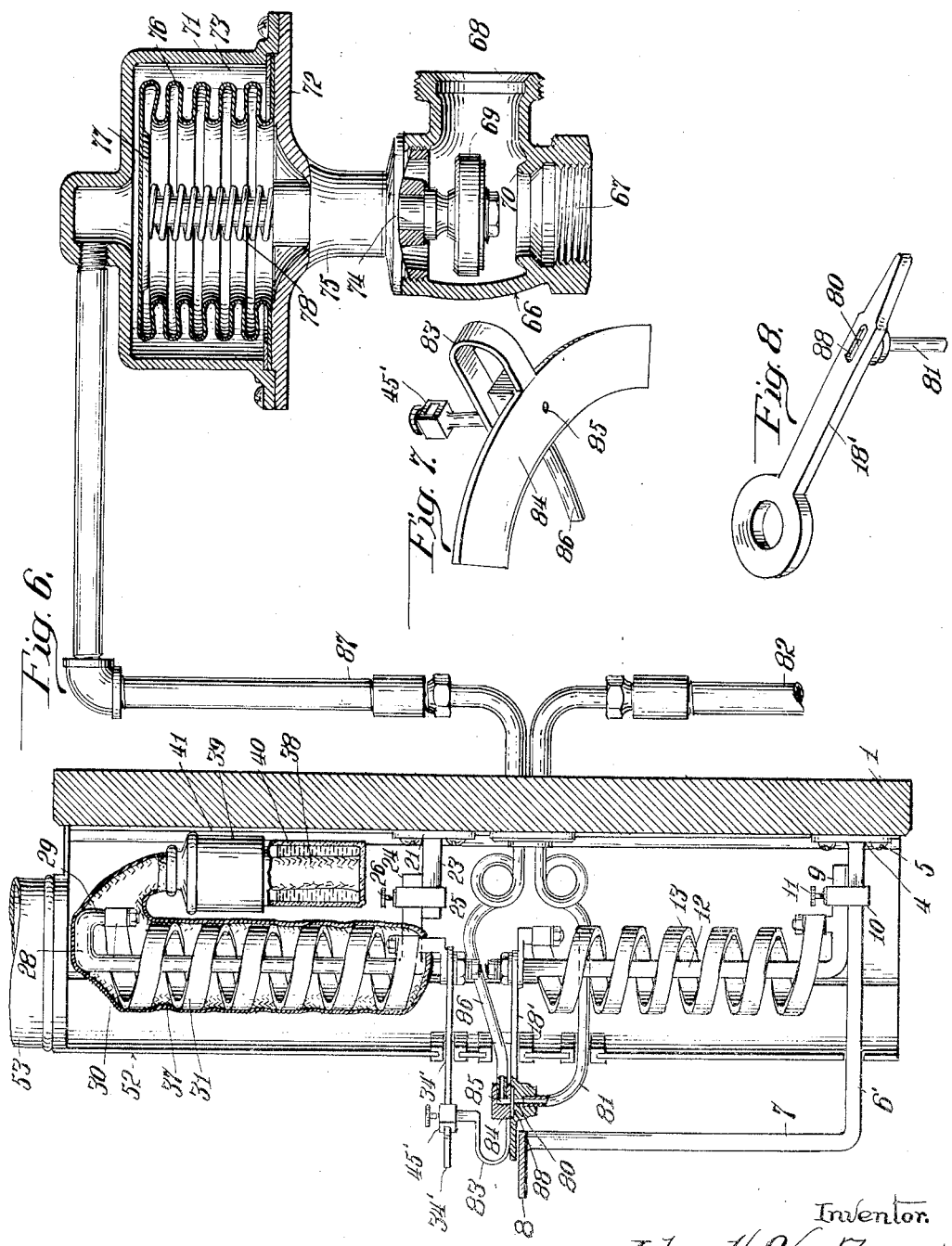
Inventor.
John H. Van Zandt
By Barrett & Truman
Attorneys Patented Mar. 30, 1937

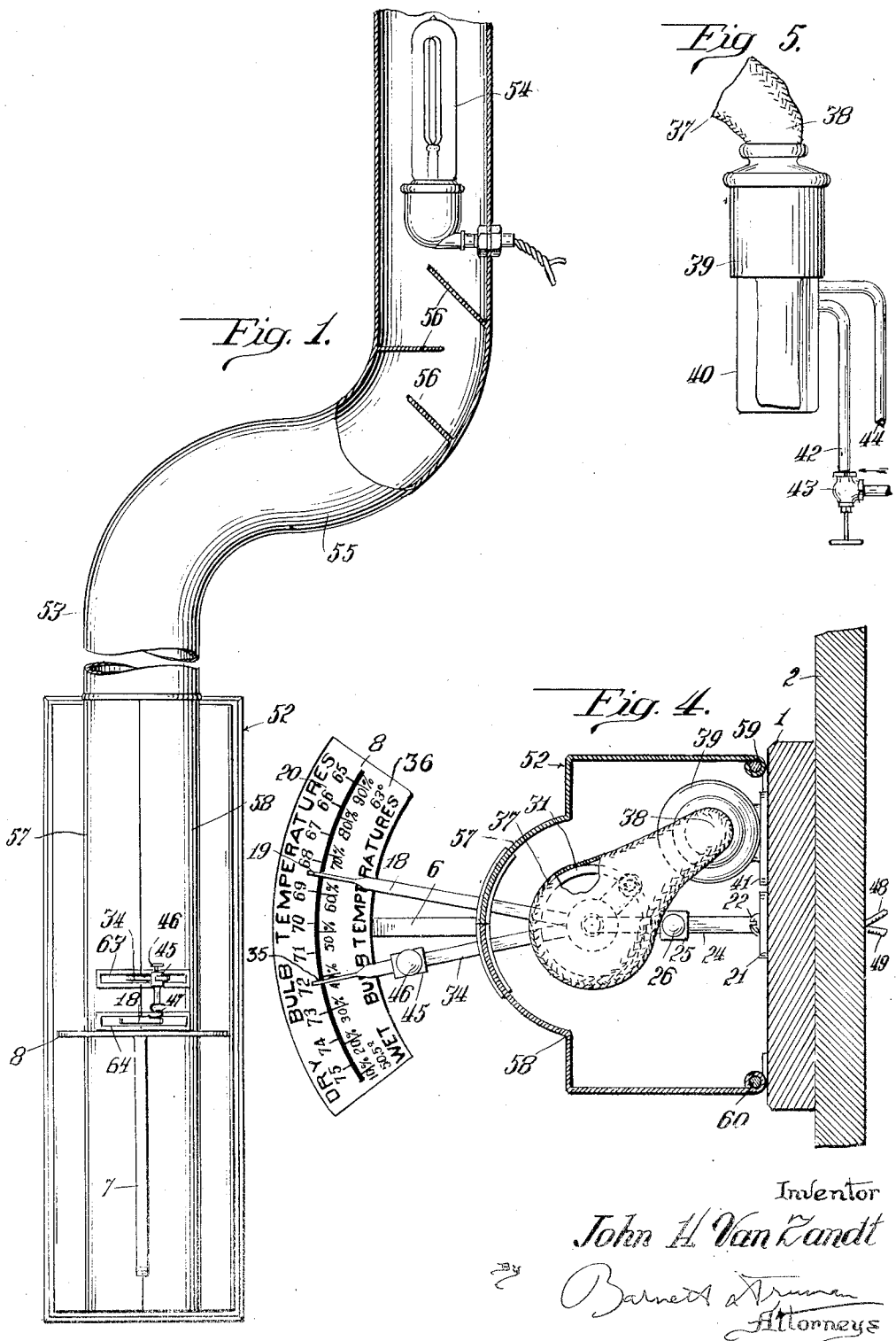

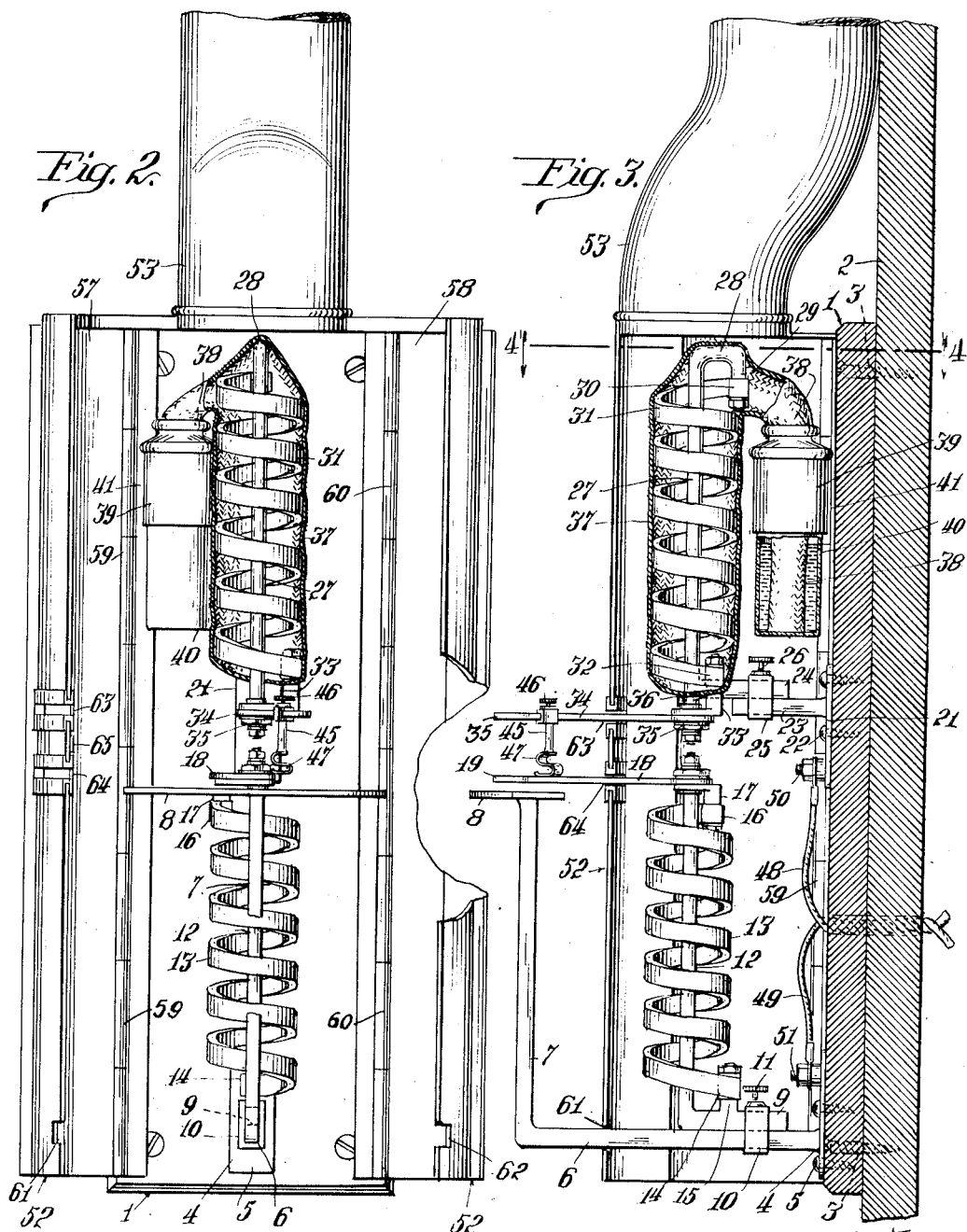

2,075,487

UNITED STATES PATENT OFFICE 2,075,487

EFFECTIVE TEMPERATURE THERMOSTAT

John H. Van Zandt, Dallas, Tex., assignor to C. A. Dunham Company, Marshalltown, Iowa, a corporation of Iowa Application March 9, 1935, Serial No. 10,206

7 Claims. (Cl. 297—2)

This invention relates to certain new and useful improvements in effective temperature thermostats, and more particularly to improved means for automatically controlling a heating system or other heat-exchange apparatus so as to maintain certain desired "effective" temperatures, that is so as to maintain a substantially constant condition of human comfort within an enclosure.

It has been determined by experimentation that, within certain temperature ranges, the physical sensation produced by any particular air temperature will vary appreciably with variation of the relative humidity of the air. It has been found, also, that if the temperature of the air is varied in a certain inverse proportion to the variation in relative humidity, the physical sensations remain substantially the same. Human comfort depends, to some extent, upon the heat dissipation by the skin surface. When the humidity increases the heat abstraction from the skin for a given air movement and temperature decreases, and the sensation of being too warm results. When the humidity decreases, the rate of heat abstraction from the skin for the same air movement and temperature increases with the result of producing a chilly sensation.

In order to produce a condition of constant comfort the usual practice has been to control the humidity, as well as the temperature. To do this requires humidifying apparatus in addition to heating apparatus.

According to the method here used, constant comfort is provided by varying the temperature of the inside air with variations in humidity by increasing the rate of heat supply automatically as the humidity decreases, and vice versa. It has been determined experimentally that there exist certain combinations of temperatures and humidities for a given air motion which produce the same feeling of comfort or discomfort. These combinations of temperatures and humidities which produce equal conditions of comfort have been charted, and the lines passing through these equally effective air conditions are known as equal comfort lines, and the term "effective temperature" as used herein indicates the constant temperature sensation, although the actual dry bulb temperature which produces this sensation will vary as the humidity varies. For example, it has been found experimentally that a maximum number of people will feel comfortable at an "effective temperature" of 65°. This effective temperature of 65° can be produced by a wide range of actual dry bulb temperatures. For example, this effective temperature corresponds to an actual dry bulb temperature of 65° Fahrenheit when the relative humidity of the air is 90%, but when the relative humidity of the air is 10% the actual dry bulb temperature will be about 75.5° Fahrenheit.

Briefly described, this apparatus comprises a pair of thermostatic elements, one responsive to dry-bulb temperatures, and the other responsive to wet-bulb temperatures, together with means for maintaining a positive circulation of air, from the enclosure whose temperature is to be regulated, in contact with the thermostatic elements. Each of these elements actuates one of a pair of cooperating movable members, these members engaging under certain predetermined temperature conditions to effect a regulating control over the heat-exchange apparatus. The cooperating movements are such, as will be hereinafter described, that the temperature maintained in the enclosure will be a predetermined "effective" temperature rather than the dry-bulb temperature usually maintained.

The general object of this invention is to provide an improved controlling apparatus for maintaining constant comfort conditions within an enclosure, as briefly described hereinabove and disclosed more in detail in the specifications which follow.

Another object is to provide an improved combination temperature-controlled and humidity-controlled mechanism for regulating a heating system.

Another object is to provide an improved effective temperature thermostat.

Another object is to provide an improved thermostatic mechanism for electrically controlling a heat-supply valve or other device in response to both temperature and humidity changes in a given space.

Another object is to provide an improved thermostatic mechanism for pneumatically controlling a heat-supply valve or other device in response to both temperature and humidity changes in a given space.

Another object is to provide an improved mechanism for visibly indicating both dry-bulb and wet-bulb temperatures within an enclosure.

Another object is to provide improved means for positively maintaining a circulation of air in contact with the thermostatic elements.

Another object is to provide improved means for causing a bi-metallic thermostat to respond to wet-bulb temperatures.

Other objects and advantages of this invention will be more apparent from the following detailed description of certain approved forms of apparatus designed and constructed according to the principles of this invention.

In the accompanying drawings:

Fig. 1 is a front elevation of the thermostatic apparatus with the casing closed, and the upper portion of the circulation flue partially broken away to show the heating element.

Fig. 2 is a front elevation, on a larger scale, of the lower portion of the apparatus shown in Fig. 1, with the enclosing casing opened and certain parts shown in section.

Fig. 3 is a side elevation of the structure shown in Fig. 2 with the adjacent half of the casing removed and certain parts shown in section.

Fig. 4 is a horizontal section, on a larger scale, taken substantially on the line 4—4 of Fig. 3.

Fig. 5 is a detail elevation showing a modified form of wet-bulb apparatus.

Fig. 6 is an elevation, partly in vertical section, showing a modified form of apparatus adapted to control the heat-exchange system pneumatically instead of electrically.

Figs. 7 and 8 are respectively perspective views of the two cooperating movable conduit members shown in Fig. 6.

Referring first more particularly to Figs. 1 to 5 inclusive, the principal portions of this thermostatic instrument are mounted on a base member 1 of insulating material mounted on the wall 2 of the enclosure or some other suitable supporting surface by means, for example, of screws 3. A bracket plate 4 secured at 5 on the lower front portion of base 1 supports a horizontally extending arm 6 from the outer end of which rises a vertical arm 7 carrying at its upper end the horizontal arcuate dial plate 8. A horizontal supporting arm 9 rests on the upper surface of arm 6 and is secured thereto by loop 10 held adjustably in place by screw 11. A vertical rod 12 projects upwardly from the outer end of bar 9. A helical bi-metallic thermostatic member 13 is positioned around the vertical rod 12 and is anchored at its lower end 14 on stud 15 projecting upwardly from bar 9. The upper movable end 16 of the thermostatic member is secured to a downwardly projecting stud 17 on a movable member 18 pivoted on the upper end portion of rod 12. The outer end 19 of member 18 is formed as a pointer and overlies the dial plate 8 so as to indicate ordinary or dry-bulb temperatures on the scale 20 of said dial.

A second supporting plate 21 is secured at 22 on an intermediate portion of the front surface of base plate 1. A bar 23 projecting forwardly from plate 21 supports a second horizontal supporting bar 24 held adjustably thereto by means of loop 25 and screw 26. A vertical supporting rod 27 extends upwardly from the outer end of bar 24, and at its upper end is bent horizontally at 28 and then downwardly at 29 to form an anchorage for the upper end 30 of a second helical bi-metallic thermostatic member 31 which surrounds the rod 27. The lower movable end 32 of thermostat 31 is secured to a stud 33 projecting upwardly from the swinging member 34 pivoted at 35 on the downwardly projecting extension 36 of vertical rod 27. The outer end portion of member 34 overlies the dial 8 and is formed with a pointer 35 to indicate wet-bulb temperatures on the scale 36. The arm 34 overlies the arm 18 as best shown in Figs. 1, 2 and 3.

The thermostatic element 31 is surrounded by a covering or sack 37 of muslin or other suitable material which extends as a wick 38 through the supporting member 39 into the bottle 40. This bottle is normally filled with water and is removably supported in the bracket member 39 secured at 41 to the base plate 1, so that the bottle may be conveniently removed for cleaning or re-filling.

In the modification shown in Fig. 5, a water supply pipe 42 provided with a needle valve 43 provides a very slow flow of water into bottle 40, any excess water being drawn out or flowing out through pipe 44. In this way a constant supply of water is maintained in bottle 40 to keep the wick saturated and it is unnecessary to re-fill the bottle at intervals, as is done with the simpler form shown in Figs. 2 and 3.

This upper thermostatic element operates on the same psychrometric principle as the well-known "wet-bulb" thermometer. By means hereinafter described a continuous flow of air is maintained over the saturated wick or covering 37. Some of the water in this wick will be absorbed or evaporated by the air stream, and the heat taken up by this evaporation process will be absorbed from the air and the thermostatic instrument so as to lower the temperature to which the instrument responds. The drier the air, that is the lower its relative humidity, the greater the amount of moisture that will be evaporated and consequently the more the temperature will be depressed or lowered. Conversely, the higher the relative humidity, that is the more highly saturated the air is, the less moisture will be evaporated from the wick and the less the temperature will be depressed. Unless the air stream is fully saturated, the wet-bulb temperatures will invariably be lower than the corresponding dry-bulb temperature, and the wet-bulb temperatures will be proportionately lower as the relative humidity of the air is decreased. Consequently the scale 36 on dial 8 which indicates wet-bulb temperatures may also be graduated in relative humidities.

A slide member 45 adjustably secured on movable arm 34 by means of screw 46, carries a spring contact 47 on its lower end which is adapted to engage the upper surface of movable arm 18 when one of these arms is positioned over the other. The two wires 48 and 49 of an electric control circuit are connected respectively with the binding posts 50 and 51 positioned respectively on the two supporting plates 21 and 4. It will be apparent that when the spring contact 47 engages movable arm 18 a circuit will be completed from wire 48 through plate 21, arms 23 and 24, swinging arm 34, slide 45, spring contact 47, movable arm 18, post 12, bars 9 and 6, and supporting plate 4 to the wire 49. When the movement of arms 34 and 18 is such as to bring the spring contact 47 out of engagement with arm 18 this circuit will be broken.

The thermostatic elements 13 and 31 are enclosed in a casing indicated generally at 52, which casing is open at its lower end and connected at its upper end with an upwardly extending flue 53. Any suitable means is provided in or adjacent to flue 53 for causing a continuous upward flow of air through the casing 52. In the example here shown, a suitable heating element such as the electric lamp 54 is positioned in an upper portion of flue 53 which is extended upwardly for a considerable distance so that a continuous upward flow of air will be created by heating the air in the upper portion of the flue. Preferably, the flue 53 is bent laterally at 55 and a plurality of baffles 56 are provided below the heating element 54. This is to prevent a down-draft and to prevent radiation from the heating element reaching the thermostatic element in casing 52 and thus disturbing the normal temperature conditions of the air that is to be measured. If some mechanical means such as a fan is used to create the upward air flow in flue or duct 53, this flue may be made much shorter than in the form here shown.

The casing 52 may be made in the form of a pair of similar sections 57 and 58 hinged to the base 1 at 59 and 60 respectively so that the sections may be swung open as indicated in Fig. 2 to permit adjustment of the thermostatic members and re-filling of reservoir 40. The sections are cut away at 61 and 62 to fit about the bracket arm 6, and are also formed with slots 63 and 64 to permit movement of the swinging arms 34 and 18 respectively. The sections may be held in closed position by any suitable spring latch as indicated at 65.

Referring now to the operation of the device, as "dry-bulb" thermostat 13 is heated or subjected to a higher temperature it will tend to straighten out or uncoil thus swinging arm 18 in a counter clockwise direction as seen in Fig. 4. As this thermostat cools, it will swing in an opposite or clockwise direction. The upper thermostat 31, which is subject to "wet-bulb" temperatures will also tend to straighten out or uncoil when heated and will then swing the arm 34 in a clockwise direction. When this wet-bulb temperature is lowered, the arm 34 will be swung in a reverse or counter clockwise direction. It will thus be seen that the two swinging arms 18 and 34 are moved in opposite directions when any change in room temperature occurs. However, if the room temperature remains constant the upper arm 34 may swing in one direction or the other in response to changes in the relative humidity of the air, and the consequent change in the wet-bulb temperature. When the temperature rises to a certain point, the two swinging arms will be brought approximately over one another so that spring contact 47 will engage arm 18 and complete the control circuit through wires 48 and 49, such control circuit being adapted through suitable mechanism not here shown to shut off the heat supply, for example close a valve. It will be obvious that the movements of the arms could be reversed, by suitable changes in the mechanism, so that a circuit would be broken instead of completed when this predetermined high temperature is reached.

We will assume that the parts are so adjusted that this contact will take place when a certain predetermined "effective" temperature is reached, for example, 65° effective temperature. Suppose now that the humidity of the air is increased. As a consequence, less moisture will be evaporated from the wicking 37, the wet-bulb temperature will not be depressed as far below the corresponding dry-bulb temperature, the arm 34 will not be swung as far in the counter clockwise direction, and the arms 34 and 18 will not be separated to as great an extent. Consequently as the temperature rises the arms will be brought together sooner and the circuit which cuts off the heat will be closed at a lower dry-bulb temperature, although this temperature will still be on the same comfort line, for example 65° effective temperature. On the other hand, assuming that the air becomes drier, that is the relative humidity is lowered, a lower wet-bulb temperature will be indicated and the controlling circuits will not be closed until a higher dry-bulb temperature is reached although the same effective temperature will be maintained.

By adjusting the slide member 45 carrying the spring contact 47 in or out along the swinging arm 34, the amplitude or rate of movement of the contact members may be varied for any given temperature change. Also, by loosening one or the other of the anchoring loops 10 and 25, one of the thermostatic assemblies may be adjusted with relation to the other so as to throw the axes of oscillation of the two arms 18 and 34 out of alignment thus changing the relative rates of movement of the two contact members for any given temperature change. The two coiled thermostats 13 and 31 can also be designed of different relative lengths so as to properly proportion the rate of movement of the two contacts. The desired change in dry-bulb temperature to maintain constant comfort conditions does not change in direct proportion to the change in relative humidity so that the apparatus as thus far described will only approximate the desired result, although the approximation is sufficiently accurate for practical purposes. By making the adjustment last described so that the rate of movement of the dry-bulb contact is not the same as the rate of movement of the wet-bulb contact a more accurate temperature control is obtained.

The modification shown in Figs. 6, 7 and 8 exerts this control pneumatically instead of electrically. At 66 is shown a valve for controlling the flow of heating medium to the radiating system, the heating medium entering through port 67 and flowing out through port 68. Movable valve member 69 may be forced down against valve seat 70 in order to cut off the flow of heating medium when a desired temperature has been reached. Casing 71 is secured to the upper flange 72 of the valve casing so as to enclose a pressure-chamber 73. Valve stem 74 projects up through the guiding neck 75 of the valve casing into the pressure chamber 73. The flexible bellows diaphragm 76 is secured at its lower end to flange 72 and at its upper end to the plate 77 secured at the upper end of valve stem 74. The spring 78 confined between flange 72 and plate 77 tends to move the valve to the open position shown at the right of Fig. 6. When air or other fluid under pressure is admitted to the chamber 73 the diaphragm 76 will be compressed against the resistance of spring 78 and thus move the valve to closed position.

Parts of the thermostatic instrument not here described may be assumed to be the same as shown in Figs. 1 to 4. The swinging arm 18' which is oscillated by the dry-bulb thermostat 13 is formed with an enlarged portion having a port 80 with which communicates the flexible pipe 81 connected with pipe or conduit 82 leading from a suitable source of air or other fluid under pressure. The slide member 45' adjustably positioned on swinging arm 34' operated by the wet-bulb thermostat is connected through spring 83 with the arcuate member 84 formed with a port 85 to which leads flexible pipe 86. Pipe 86 connects with the pipe or conduit 87 leading to the valve-operating pressure chamber 73. The arcuate member 84 rests slidably on the portion 79 of the lower swinging arm 18', the parts being held closely together by spring 83. When the ports 80 and 85 register with one another, pressure fluid will flow through the conduit system just described to pressure chamber 73 and thus close the valve to shut off the heat supply.

When the swinging arms move so as to bring the ports out of register, the flow of pressure fluid will be cut off by the arcuate member 84, closing port 80, and the port 85 will be open to the atmosphere so that the pressure in chamber 73 will be relieved and spring 78 will again open the valve 69. The port 80 terminates in a radially extending pocket 88 so that the other port 85 may communicate therewith in different positions of adjustment of the arcuate member 84. Otherwise the thermostatic instrument operates in the same manner as already described in connection with the first form of the invention.

It will be understood that the terms dry-bulb temperature and wet-bulb temperature as used hereinabove and in the claims which follow have the commonly accepted meaning in this art and do not imply that there are any mercurial thermometers or similar apparatus involved in this mechanism.

I claim:

1. An effective temperature thermostat comprising a pair of thermostatic elements, one responsive to dry-bulb temperatures and the other responsive to wet-bulb temperatures, a pair of members movable along similar substantially parallel paths, means actuated by one of the thermostats for reciprocating one member in one direction or the other as the dry-bulb temperature rises or falls respectively, means actuated by the other thermostat for reciprocating the other member in directions opposed to the movements of the first member as the wet-bulb temperature rises or falls respectively, and means positioned on the members so as to be brought into effective engagement at a certain predetermined effective temperature to control a heat-transfer apparatus.

2. An effective temperature thermostat comprising a pair of thermostatic elements, one responsive to dry-bulb temperatures and the other responsive to wet-bulb temperatures, a pair of members positioned to be moved into and out of effective engagement with each other at a certain predetermined effective temperature to control a heat-transfer apparatus, and means actuated by the respective thermostatic elements for separately moving the two members in opposed directions, one in response to dry-bulb temperature changes and the other in response to wet-bulb temperature changes, and means for maintaining a positive circulation of air in contact with the thermostatic elements.

3. An effective temperature thermostat comprising a pair of independently operating thermostatic elements each having a portion moving in response to changes in the temperature to which the elements are exposed, evaporating means cooperating with one of the thermostatic elements so that its movements will respond to changes in the wet-bulb temperature corresponding to the dry-bulb temperature to which the other element is subjected, a pair of members movable along similar substantially parallel paths so as to move into effective engagement at a certain predetermined effective temperature to control a heat-exchange apparatus, means actuated by the respective thermostatic elements to separately move the two members in opposed directions, and means for adjusting the relative rates of movement of the two members.

4. An effective temperature thermostat comprising a pair of bi-metallic thermostatic elements, evaporating means associated with one of these elements so that it will be responsive to wet-bulb temperatures, a pair of members movable along similar substantially parallel paths, means actuated by the dry-bulb thermostat for reciprocating one of these members in one direction or the other in response to a rise or fall respectively in the dry-bulb temperature, means actuated by the wet-bulb thermostat for reciprocating the other member in a direction opposed to the movement of the first member in response to said temperature change, a pneumatically operated device for controlling a heat-transfer apparatus, a pair of movable conduit members with ports positioned respectively on the two movable members so as to be brought into open communication with each other at a certain predetermined effective temperature, and a supply conduit comprising two branches, one leading from a source of fluid under pressure to one of the movable conduit members and the other leading from the other movable conduit member to the pneumatically operated device.

5. An effective temperature thermostat comprising a pair of independently acting helical bimetallic thermostatic elements, means for supporting each helix and anchoring one end thereof, a pair of pivoted arms adapted to swing in adjacent parallel planes about substantially the same axis, one of these arms being connected with the movable end of one helix and the other arm being connected with the movable end of the other helix, the elements being so positioned that the arms will be swung in opposed directions as the temperature rises or falls, a reservoir for a supply of water, a covering of absorbent material for one of the helices having a portion extending as a wick into the reservoir to saturate the covering, means for maintaining a flow of air in contact with the thermostatic elements, and means operated by the engagement of the arms at a predetermined effective temperature to control a heat-exchange apparatus.

6. An effective temperature thermostat comprising a pair of independently acting helical bimetallic thermostatic elements, means for supporting each helix and anchoring one end thereof, a pair of pivoted arms adapted to swing in adjacent parallel planes about substantially the same axis, one of these arms being connected with the movable end of one helix and the other arm being connected with the movable end of the other helix, the elements being so positioned that the arms will be swung in opposed directions as the temperature rises or falls, a reservoir for a supply of water, a covering of absorbent material for one of the helices having a portion extending as a wick into the reservoir to saturate the covering, means for maintaining a flow of air in contact with the thermostatic elements, and a pair of electric contact members respectively carried by the arms and adapted to engage at a predetermined effective temperature to complete a control circuit for a heat-exchange apparatus.

7. An effective temperature thermostat comprising a pair of independently acting helical bimetallic thermostatic elements, means for supporting each helix and anchoring one end thereof, a pair of pivoted arms adapted to swing in adjacent parallel planes about substantially the same axis, one of these arms being connected with the movable end of one helix and the other arm being connected with the movable end of the other helix, the elements being so positioned that the arms will be swung in opposed directions as the temperature rises or falls, a reservoir for a supply of water, a covering of absorbent material for one of the helices having a portion extending as a wick into the reservoir to saturate the covering, means for maintaining a flow of air in contact with the thermostatic elements, a pneumatically operated device for controlling a heat-transfer apparatus, a pair of movable conduit members with ports positioned on the respective swinging arms so as to be brought into open communication with each other at a certain predetermined effective temperature, and a supply conduit comprising two branches, one leading from a source of fluid under pressure to one of the conduit members, and the other leading from the other conduit member to the pneumatically operated device.

JOHN H. VAN ZANDT.